Aug. 12, 1941.  F. H. BEHL  2,252,610
PIVOTED POWER TAKE-OFF UNIT
Filed Oct. 22, 1940  3 Sheets-Sheet 2
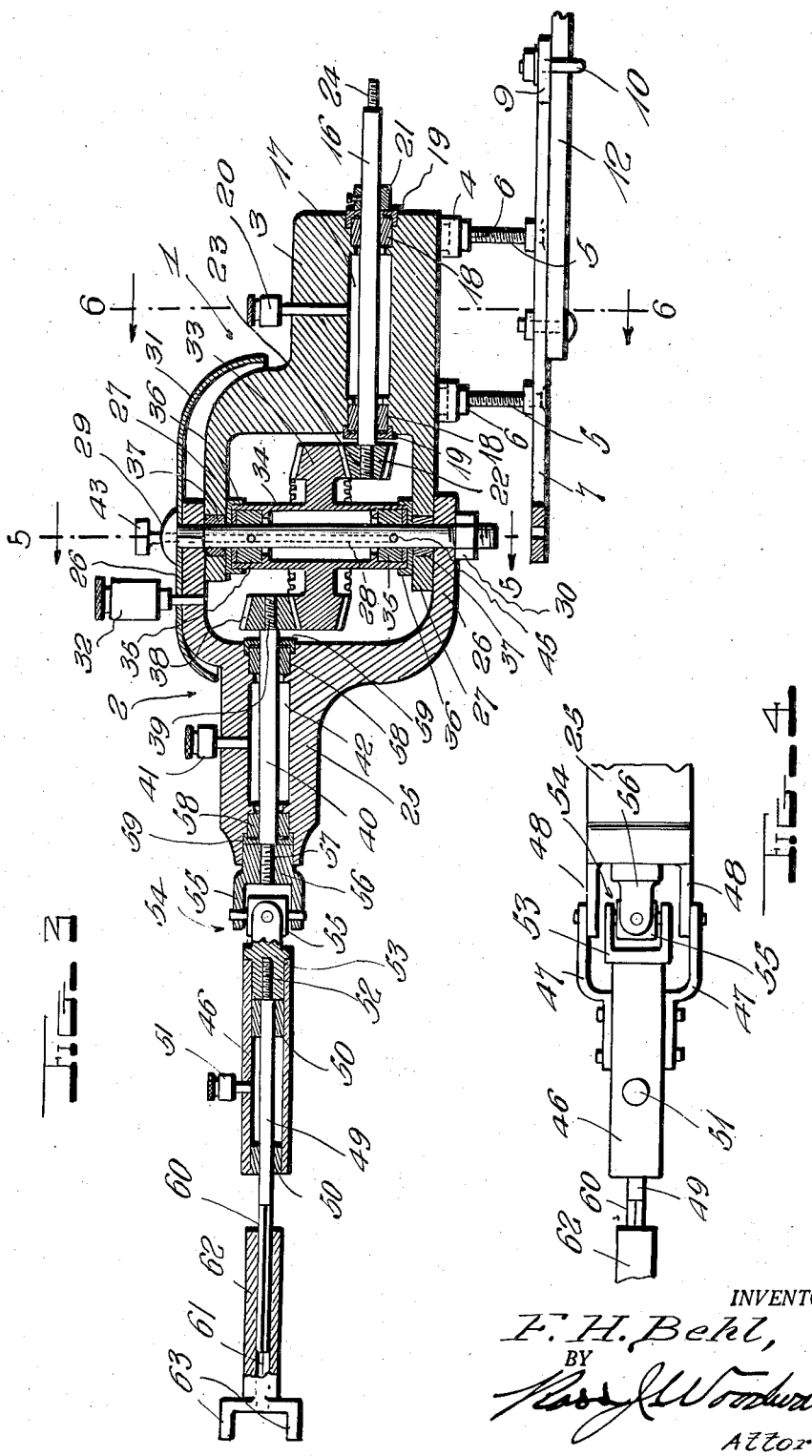
INVENTOR.
F. H. Behl,
BY
Attorney Aug. 12, 1941.  F. H. BEHL  2,252,610
PIVOTED POWER TAKE-OFF UNIT
Filed Oct. 22, 1940  3 Sheets-Sheet 3
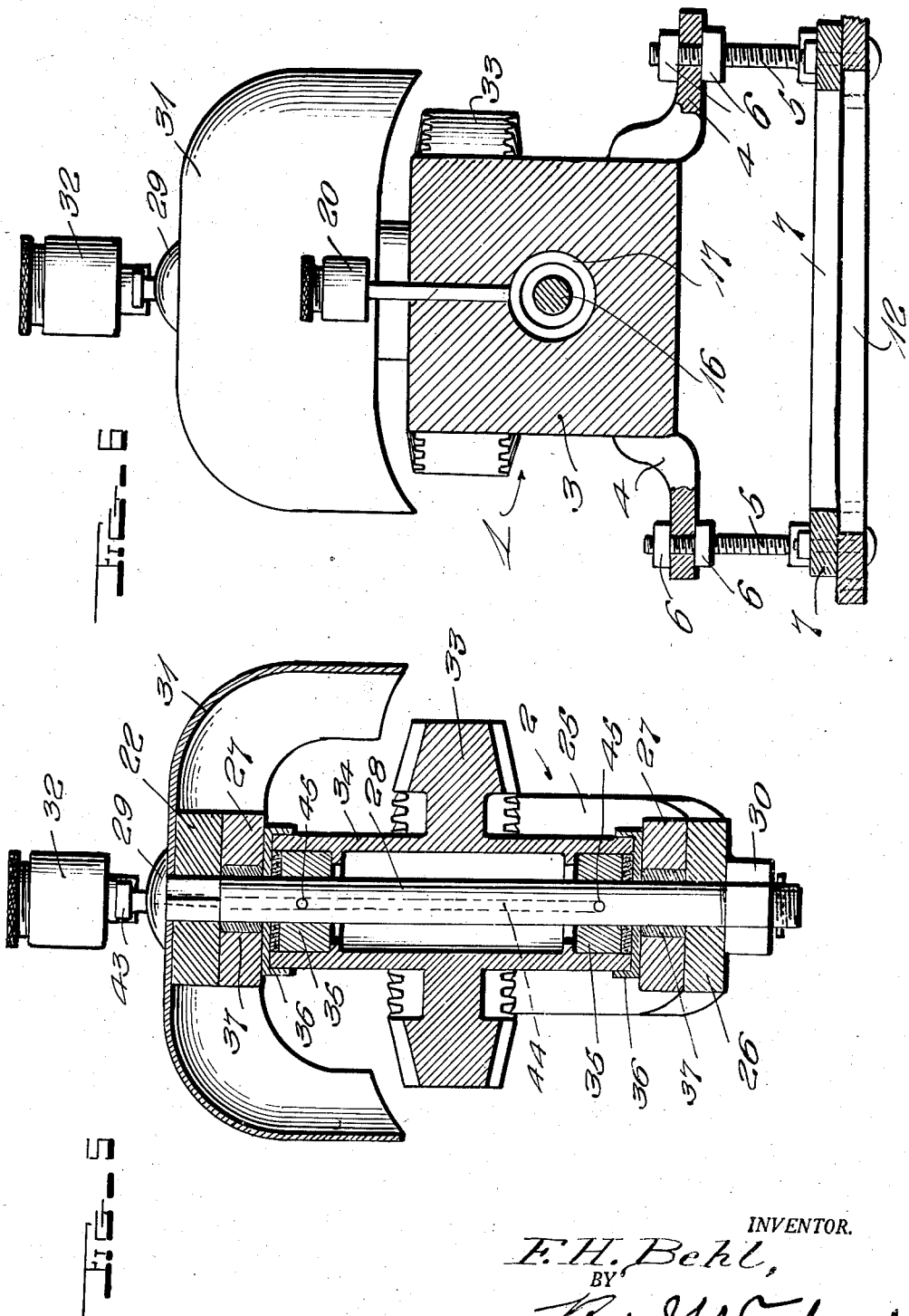
INVENTOR.
F. H. Behl,
BY
Attorney Patented Aug. 12, 1941

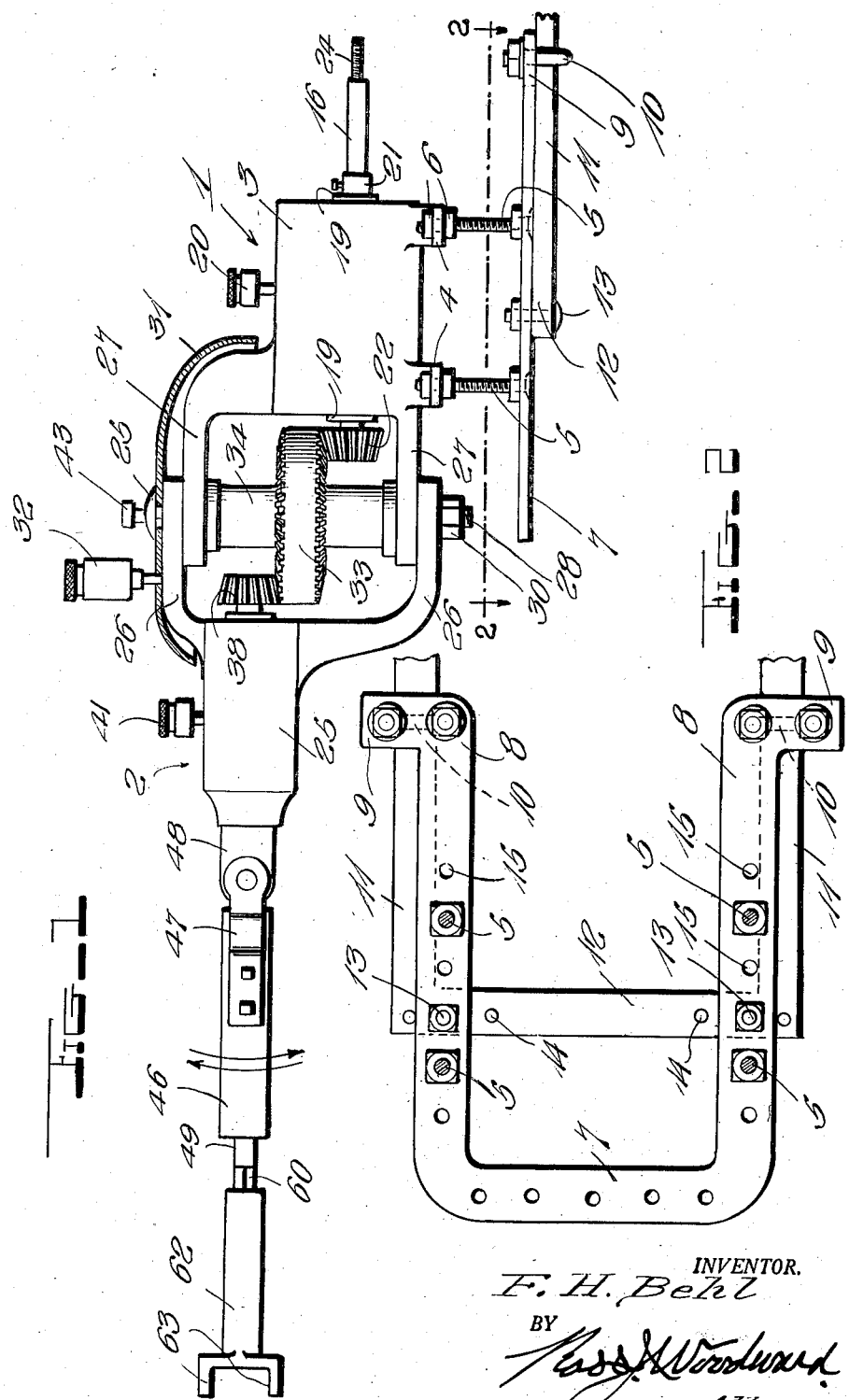

2,252,610

UNITED STATES PATENT OFFICE 2,252,610

PIVOTED POWER TAKE-OFF UNIT

Fred H. Behl, Milan, Minn.

Application October 22, 1940, Serial No. 362,293

6 Claims. (Cl. 180—14)

This invention relates to a power take-off unit and more particularly to a unit of this character adapted for use in connection with a tractor, truck or other towing vehicle.

One object of the invention is to provide a power take off unit of such construction that it may be readily mounted upon the draw bar of a truck or tractor and adjusted towards and away from the vehicle longitudinally of the draw bar and thus disposed in such position that the drive shaft of the power take off device may be operatively connected with the power take off shaft of the tractor.

Another object of the invention is to provide a power take off unit including a stationary section adapted to be mounted upon the draw bar of the tractor and a companion section which is pivotally mounted for transverse swinging movement and thus allow power to be transmitted to a machine directly back of the tractor or offset transversely thereof.

Another object of the invention is to provide an improved arrangement of gearing by means of which rotary motion may be transmitted through the power take off unit to a machine directly back of a tractor or offset transversely thereof.

Another object of the invention is to provide a power take off unit wherein a shaft which is connected with a machine to be driven has its forward or inner end connected with a countershaft by a universal joint so that rotary motion may be imparted to the driven shaft from the countershaft with these shafts either in alinement or in angularly offset relation to each other.

Another object of the invention is to provide a power take off unit having an improved lubricating system by means of which the oil or grease may be delivered to the shafts and other gears.

The improved power take off unit is illustrated in the accompanying drawings, wherein Figure 1 is a side elevation.

Figure 2 is a view taken along the line 2—2 of Figure 1 looking down upon the draw bar.

Figure 3 is a sectional view taken longitudinally through the power take off unit.

Figure 4 is an enlarged top plan view of the universal joint between the countershaft and the driven shaft at the rear of the unit.

Figure 5 is a sectional view upon an enlarged scale taken along the line 5—5 of Figure 3.

Figure 6 is a sectional view upon an enlarged scale taken along the line 6—6 of Figure 3.

This improved power take off unit has a forward section 1 and a rear section 2, the forward section having a body 3 formed at its bottom with side feet 4 through which pass upper end portions of bolts 5. These bolts 5 carry nuts 6 between which the feet 4 are gripped to securely hold the body 3 of the section 1 at a predetermined height above a draw bar or base 7. Referring to Figure 2 it will be seen that the draw bar or base 7 is of U-shaped construction and has its arms 8 formed with side extensions or feet 9 through which extend U-bolts 10 to securely but adjustably hold the feet in engagement with the side arms 11 of a U-shaped draw bar 12 for a tractor. The bolts 13 pass through selected ones of the openings 14 formed in the cross bar of the draw bar 12 and the U-bolts are then tightened. It will thus be seen that the draw bar or base 7 may be adjusted longitudinally of the draw bar 12 of the tractor. Since the bolts 5 which constitute legs for the rear section 1 of the power take off unit are passed through selected ones of the openings 15 formed in the side arms 8 of the base or draw bar 7, the power take off unit may be adjusted upon this base independently of adjustment of the base itself. Therefore, when applying the device to a tractor, it may be easily adjusted to such a position that the driving shaft 16 of the device may be easily connected with a conventional power take off shaft of tractor.

The body 3 of the front section 1 of the power take off unit is formed of strong metal, and referring to Figure 3 it will be seen that the drive shaft 16 extends longitudinally of the body 3 through a bore or passage 17 extending longitudinally of the body. Bearings 18 are mounted in end portions of the passage 17 and held in place by sealing washers 19 for preventing grease from escaping at ends of the bore or passage. This grease or other lubricant is fed to the passage 17 from a grease cup 20 which is carried by the upper portion of the body 3 and communicates with the passage 17, as shown in Figure 3. A collar 21 which is secured about the shaft 16 at the front end of the body prevents the shaft from shifting rearwardly through the passage 17 and at its rear end the shaft 16 carries a beveled gear or pinion 22 which is screwed upon the reduced end portion 23 of the shaft. A left hand thread is provided for the pinion and the reduced end of the shaft in order that the pinion will not work loose when the shaft is turned. The forward end of the shaft is also provided with a reduced end 24 having a left hand thread in order that it may be connected with the power take off shaft of the tractor and turned without working loose.

The rear section 2 of the power take off device is also formed of strong metal and has a body 25 provided with arms 26 which overlap arms 27 of the forward section where they are pivotally mounted by a rod or pin 28. This rod or pivot pin has the formation of a large bolt and is provided at its upper end with a head 29 and a threaded lower end portion carrying a nut 30. A plate or shield 31 formed of sheet metal fits about the rod or pin 28 between its head and the upper arm of the rear section and serves to protect gearing mounted between the two sections. A grease cup 32 which is mounted through the shield and the upper arm of the rear section serves not only to deliver grease to the gearing but also as means for holding the shield in fixed relation to the rear section and causing it to turn with this section. Referring to Figure 3 it will be seen that the pin or rod 28 is surrounded by a large double gear 33 carried by a sleeve or cylindrical hub 34. The sleeve or hub fits loosely about the rod or pin 28 between the arms 27 of the front section and within its upper and lower end portions are mounted bearings 35 held in place by sealing washers 36. There have also been provided bushings 37 in the arms of the forward section to permit turning of the rod or pin with the rear section without wear coming directly upon the arms 27. The forward portion of the lower teeth of the double gear 33 mesh with the smaller pinion 22 and the rear portion of the upper teeth of the double gear mesh with a small pinion 38 carried by the reduced end portion 39 of a counter-shaft 40. It will thus be seen that rotary motion may be transmitted through the gear 33 and the pinions from the drive shaft 16 to the counter-shaft and that the rear section 2 may be swung about the rod or pin 28 as a pivot to transversely adjusted positions. A grease cup 41 which is mounted through the upper portion of the body 25 of the rear section serves to deliver grease into the bore or passage 42 through which the countershaft passes. It is also desirable to lubricate the bearings 35 and in order to do so there has been provided a grease cup 43 mounted at the upper end of the rod or pin 28. This grease cup 43 communicates with a grease passage 44 extending longitudinally of the pin or rod and having side outlets 45 through which the grease or oil is delivered to the bearings 35. By this arrangement the bearings may be lubricated when necessary and the large double gear caused to turn easily about the rod.

An auxiliary section 46 is mounted back of the rear section 2 and carries arms 47 along its sides which are pivoted to arms 48 extending rearwardly from the body portion 25 of the rear section. A shaft 49 extends longitudinally through the section 46 where it is rotatably mounted in bushings or bearings 50 and this shaft is lubricated by grease delivered from a grease cup 51. The forward end of shaft 49 is reduced and threaded, as shown at 52, and this reduced end portion which has a left hand thread is screwed into the rear member 53 of a universal coupling 54. The universal coupling includes the usual block 55 to which the forward member 56 of the coupling is pivotally mounted for pivotal movement at right angles to the direction in which the rear member pivots and this forward member 56 has a left hand threaded engagement with the reduced end portion 57 of the transmission shaft 40. The shaft 40 is also provided with bearings 58 held in place by sealing washers 59 in order that grease in the chamber 42 will be prevented from escaping. Referring particularly to Figure 3 it will be seen that the shaft 49 extends rearwardly from the auxiliary section 46 and has a squared rear end portion 60 which is slidably engaged in the squared bore 61 of a sleeve 62. This sleeve has forks 63 at its rear end and constitutes a portion of a coupling for connecting the shaft 49 with the drive shaft of a machine which is to be towed back of the tractor and hitched to the draw bar 12 in the usual manner. While it has been stated that the machine to be operated is connected with the draw bar of the tractor in order that it may be drawn forwardly back of the same, it will be understood that the tractor may be employed for driving a stationary machine such as a thrashing machine or the like which may be directly back of the tractor or in lateral offset relation thereto. When a harvester or the like is connected with the tractor and drawn forwardly, turns may be made as the two sections of the power take off device may have pivotal movement relative to each other and uneven places in the ground over which the machine is towed may be followed as the universal joint 54 permits movement of the rear section 25 and the auxiliary section 46 relative to each other.

Having thus described the invention, what is claimed as new is:

1. In a power take off device, front and rear sections pivotally connected, shafts journaled through the front and rear sections, gearing for transmitting rotary motion from one shaft to the other, a base adapted to be adjustably connected with the draft bar of a towing vehicle, and supporting members adjustably carried by the base and adjustably connected with the forward section.

2. A power take off device comprising front and rear sections pivotally connected, shafts journaled to said sections, gearing for transmitting rotary motion from one shaft to the other, a U-shaped base having openings in its arms, the arms terminating in feet for extending across arms of a draw bar of a towing vehicle, means for securing the feet to the arms of the draw bar, fasteners for detachably securing the arms of the base to the draw bar of the towing vehicle, feet extending from sides of the forward section of the power take off device, and threaded supports secured through selected openings in the arms of the base and having their upper ends removably and adjustably secured through the feet of the power take off device.

3. In a power take off unit, front and rear sections pivoted to each other, shafts journaled through said sections, gearing for transmitting rotary motion from one shaft to another, a base adapted to be connected with the draw bar of a towing vehicle and having side portions formed with openings, feet extending from opposite sides of the front section of the unit, threaded supporting members passed vertically through selected openings of the base and firmly secured therein with their upper end portions passing through the feet of the forward section, and securing nuts carried by the upper portions of the threaded members for securing the feet in place upon the threaded members.

4. A power take off unit comprising front and rear sections having arms extending from their inner ends, a rod passing through said arms to pivotally connect the sections, shafts journaled through said sections with their inner ends protruding into space between the arms of the sections, pinions carried by the protruding inner end portions of said shafts, a gear meshing with said pinions and having a hub portion rotatably mounted about the rod, a shield fitting about the upper end of the rod and extending outwardly and downwardly in shielding relation to the arms and the gearing, and a lubricant cup having a discharge neck extending through the shield and the upper arm of one section and located over the pinion of the shaft carried by the last-mentioned section for depositing lubrication upon the pinion at the inner end of the shaft carried by the said section.

5. A power take off device comprising front and rear sections pivotally connected at their inner ends, shafts journaled through said sections, gearing for transmitting rotary motion from one shaft to the other, an auxiliary section extending rearwardly from the rear section, an auxiliary shaft journaled through the auxiliary section, a universal coupling connecting the auxiliary shaft with the shaft of the rear section, the said auxiliary shaft having a rearwardly protruding portion having a flat face, and a coupling member for connecting the auxiliary shaft with a drive shaft of machinery to be driven from the power take off unit, said coupling having a sleeve formed with a bore slidably receiving the protruding rear portion of the auxiliary shaft and conforming to the transverse contour thereof to prevent turning of the sleeve and the auxiliary shaft relative to each other.

6. A power take-off unit comprising companion sections having arms at their inner ends, a rod passing through said arms to pivotally connect the sections, shafts journaled through said sections, intermeshing gears carried by the rod and the inner end portions of said shafts for transmitting rotary motion from one shaft to the other, a shield carried by the upper end of said rod in shielding relation to the arms and the gears, and a lubricant cup having a discharge neck extending through the shield and the upper arm of one section and located over the gear of the shaft carried by the last mentioned section for depositing lubricant upon the gear at the inner end of the shaft carried by said section.

FRED H. BEHL.